No. 670,902. Patented Mar. 26, 1901.
P. A. MYERS.
POWER FORCE PUMP.
(Application filed Aug. 1, 1899.)
(No Model.) 2 Sheets—Sheet 1.
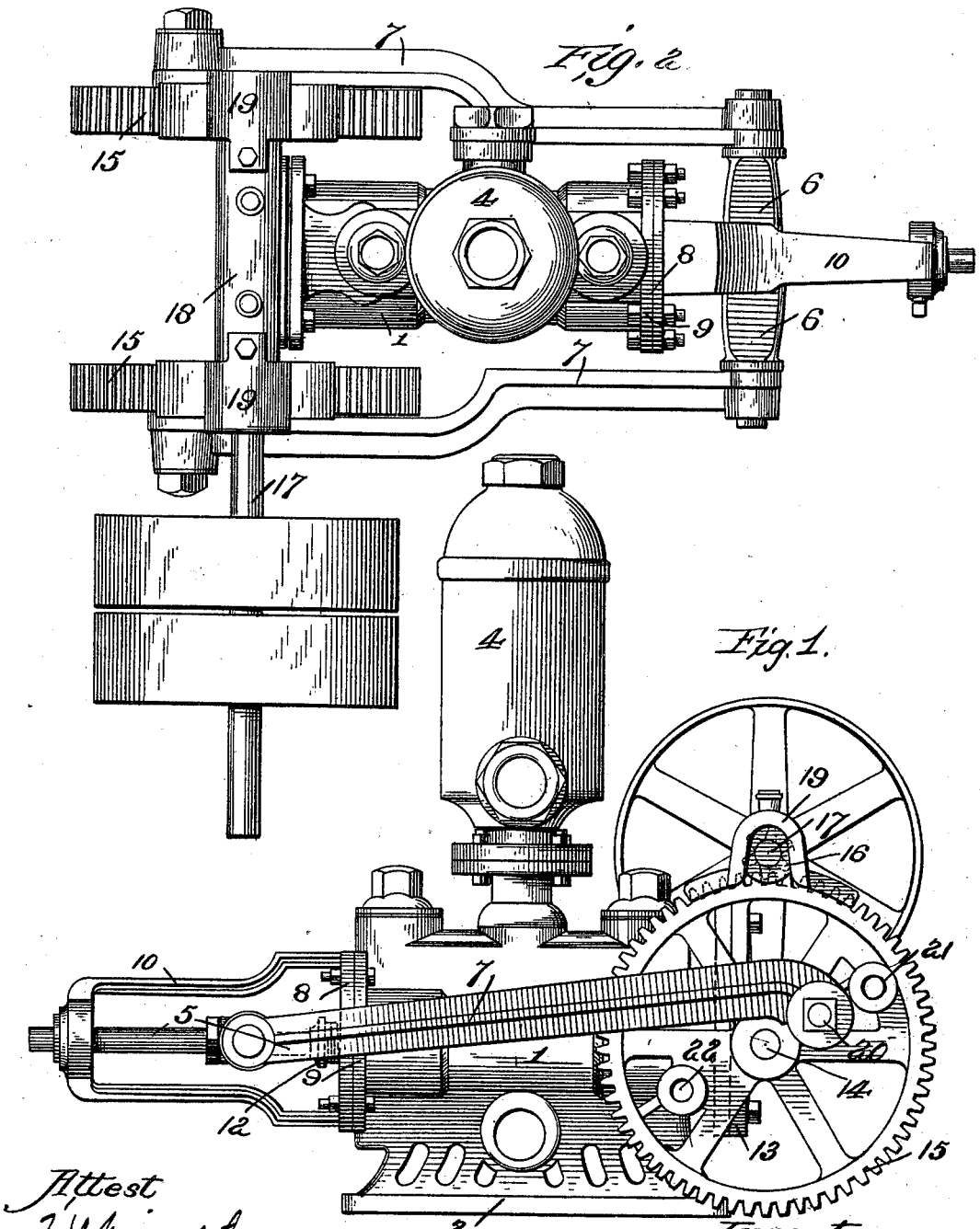

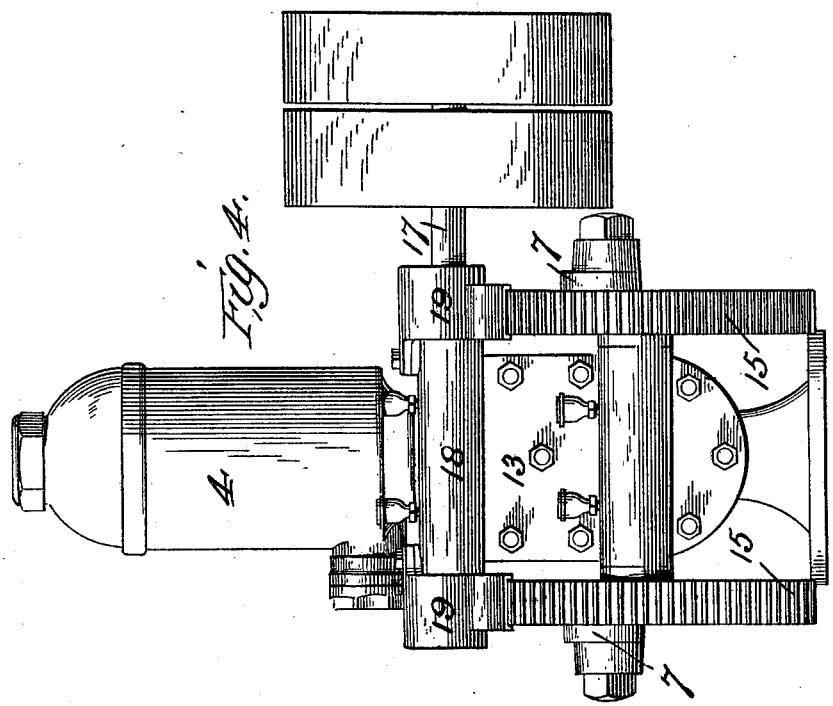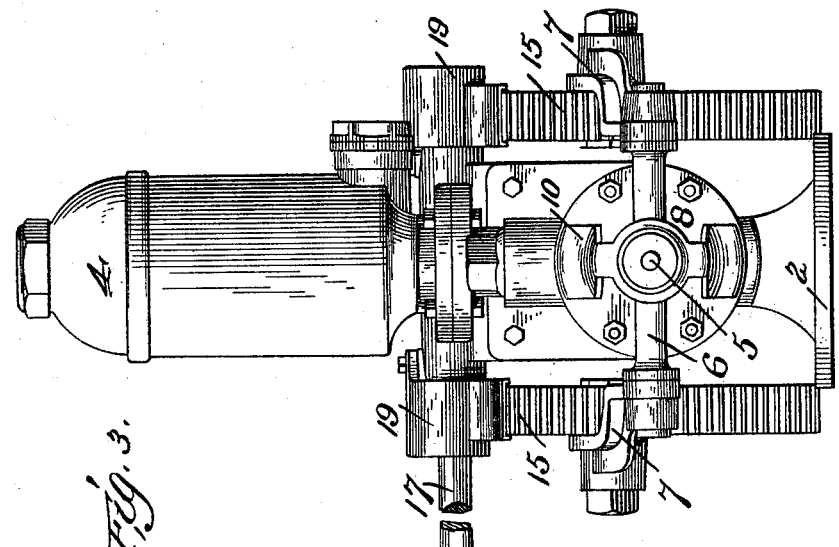

UNITED STATES PATENT OFFICE.

PHILIP A. MYERS, OF ASHLAND, OHIO.

POWER FORCE-PUMP.

SPECIFICATION forming part of Letters Patent No. 670,902, dated March 26, 1901.

Application filed August 1, 1899. Serial No. 725,797. (No model.)

*To all whom it may concern:*

Be it known that I, PHILIP A. MYERS, a citizen of the United States, residing at Ashland, Ohio, have invented certain new and useful Improvements in Power Force-Pumps, of which the following is a specification.

My invention relates to power force-pumps; and the object thereof is to provide a compactly-built pump, adapted to operate in the ordinary way, having great strength and of few parts, so that an efficient device may be built at a comparatively small cost.

The invention is illustrated in the accompanying drawings, in which—

Figure 1 is a side elevation of the pump. Fig. 2 is a plan view of the same. Fig. 3 is a view of one end thereof, and Fig. 4 is a view of the opposite end.

As it is the object of this invention to reduce the number of parts of the pump, to lessen the cost of manufacture of the same, and to arrange the parts thereof in a compact form and in such positions that the strain will be at the minimum, I have sought to use and place every part of the pump to the best advantage. In the present invention the ordinary pump-frame is entirely dispensed with, and the cylinder 1 and the base 2 are cast in one piece. Upon this cylinder is mounted the usual air-reservoir 4, having the usual inlet from the cylinder and a suitable discharge. The piston which reciprocates within the cylinder is provided with the usual rod 5, carrying a cross-bar 6, having the forward ends of pitmen 7, one of which is located on each side of the cylinder, pivotally connected thereto. The forward end of the cylinder is closed by a head 8, bolted to an annular flange 9 surrounding the same, and said head has a yoke 10 projecting from the face of the same, which provides a guide for the piston-rod. The yoke forms the outer guide for the piston-rod, which is also guided in a removable bushing 12, threaded in a central opening extending through the head 8, through which the piston-rod passes. The rear end of the cylinder is closed by a head 13, having a boss extending transversely of the same in a line with the axis of the cylinder, which forms a bearing for the drive-shaft 14, having a crank-wheel 15 fixed to each end thereof. The peripheries of said wheels are toothed and mesh with pinions 16, fixed to a power-shaft 17, which is journaled in a bearing 18 in the upper end of an extension of the head 13. A guard 19, bolted to said bearing at each end thereof, incloses the pinions, and said guards have wings extending over the parts of the peripheries of the wheels 15 contiguous to said pinions. The pitman-rods are pivotally connected at their forward ends to said crossbar, and their rear ends have a wrist-pin connection with the crank-wheels. In the present case each wheel is provided with three points of attachment for the pitman-rods— that is, three sockets adapted to receive the wrist-pins, the socket 20 being located close to the center of the wheels, the socket 21 near the periphery of the same, and the socket 22 at a point intermediate of the other two, to give varying lengths of stroke.

As will be seen, the crank-wheels are driven directly from the power-shaft, and the power is applied at the farthest point possible from their centers, giving the maximum leverage.

The shaft carrying the crank-wheels being arranged at the rear of the cylinder, the cylinder forms a backing for the bearing thereof, and as a long bearing is provided therefor and the shaft is in the axial line of said cylinder twisting of this shaft is impossible.

I claim—

In combination in a pump, the horizontal cylinder, a power-shaft, a bearing for the power-shaft carried by the cylinder-head at the upper part thereof, a transmitting-shaft, a bearing therefor also carried by the cylinder-head centrally thereof and below the upper bearing, the toothed wheels on the transmitting-shaft and extending along each side of the horizontal cylinder, the pinions on the power-shaft engaging with the toothed wheels, the pitmen, one on each side of the cylinder connected to the toothed wheels, and the connection between the pitmen and the piston-rod, substantially as described.

In testimony whereof I affix my signature in presence of two witnesses.

PHILIP A. MYERS.

Witnesses:
OAK McCRAY,
R. M. TUBBS.